C. DREIBUSS & A. F. KULAGE.
RAILWAY RAIL JOINT FASTENING.
APPLICATION FILED NOV. 20, 1908.
934,960.
Patented Sept. 21, 1909.
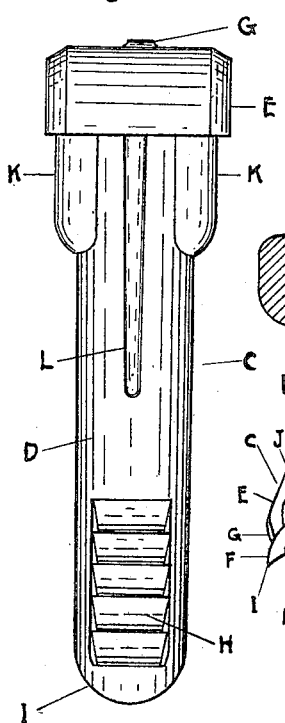
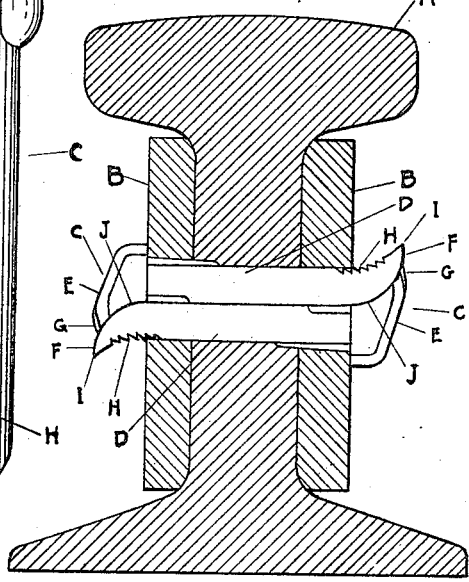
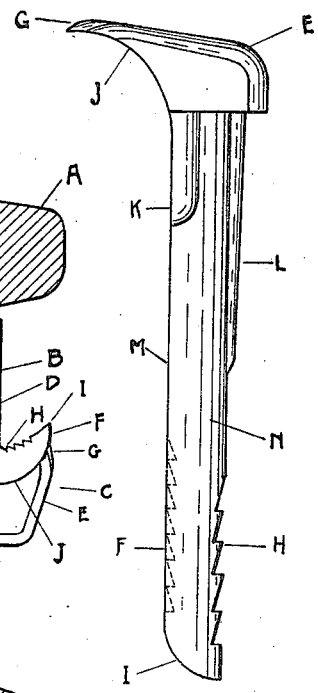
Witnesses
Louis Balbach.
Edward Loeed.
Inventors
Charles Dreibuss
Anthony F. Kulage
Per Matt J. Scherer
Attorney

UNITED STATES PATENT OFFICE.

CHARLES DREIBUSS AND ANTHONY F. KULAGE, OF ST. LOUIS, MISSOURI.

RAILWAY-RAIL-JOINT FASTENING.

934,960.

Specification of Letters Patent. Patented Sept. 21, 1909.

Application filed November 20, 1908. Serial No. 463,679.

*To all whom it may concern:*

Be it known that we, CHARLES DREIBUSS and ANTHONY F. KULAGE, citizens of the United States, residing at St. Louis, State of Missouri, have invented a new and useful Railway-Rail-Joint Fastening.

Our invention relates to improvements in railway-rail joint fastenings, in which the railway rails are fastened by means of perforated fish plates held together by half round wedge shaped keys, which keys are tightened by driving them together and toward each other, and which are held tight by means of small teeth and notches in their surfaces, which teeth and notches grip the outside edge of the fish plate and a tongue on the head of the key.

The object of our invention is first:—to substitute for the usual bolts now used in railway rail joint fastenings half round tapered wedge-shaped keys with teeth on one side and notches on the other side. Second:—to provide a key bolt that will fit any perforated fish plate, be the perforation round, elliptical or well worn. Third:—to provide a key bolt that can be tightened at any time that the perforation in the fish plate becomes larger by wear, contraction, or jar of cars passing over the rails.

The objects are attained by means illustrated in the accompanying drawings in which—

Figure 1 is a vertical section of the railway rails and fish plates together with a side view of two keys driven tight, showing how the teeth on the surface of the key grasp the outside edge of the fish plate and how the tongue on the head of the key grasps the notches on the inside surface of the key; Fig. 2 is a full size top view of the key; and Fig. 3 is a full size side view of the key.

Similar letters refer to similar parts throughout the several views.

Referring to Fig. 1 the railway rails are represented by the letter A; the fish plates which join the rails are represented by letter B. Letter C. represents the key as a whole; letter D. the half round tapered shank of the key C, the square head of the key C. is shown by E. Letter F. shows a series of notches in the flat and inside surface of the shank of the key C., into which notches F. a tongue G. on the head E. of the key fits, and holds fast the other key which goes to make up the bolt. One of the teeth H, on the rounded surface of shank D. grasps the outside edge of the hole in the fish plate, and the tongue G. catches in one of the notches F. Letter I indicates the pointed end of the shank D. The shank D. is pointed, which is shown by the letter I so that the point of the key C. will follow the flat rounded inside surface at J.

In Fig. 2 a top view of the key C. is shown with the teeth H near the end of the shank D. The tongue which grasps the notches F. on the inside of the other key is shown by G. A tapered rib L. extends from the head E. half way the length of the shank D. which rib L. makes it possible for the key to fit any sized hole or any well worn hole in the fish plate. The burs K. are projections on the shank D. which will permit the key to be used either in a round or elliptical hole in the fish plate.

Referring to Fig. 3, the notches into which the tongue G. fits are shown in dotted lines in the flat surface M. by the letter F. The semicircular surface of the shank D. is shown by letter N. The teeth which grasp the edge of the hole in the fish plate B. are shown by the letter H.

In fastening the fish plates joining the rails the keys are placed into the holes, one on each side and driven toward each other. As this is done the points I slide along the flat rounded surface J. and the teeth H grasp the edge of the hole in the fish plate and at the same time the tongue G. slips into one of the notches F. If the holes in the fish plates are elliptical or worn instead of the standard size, the burs K. will fill in the elliptical part of the hole and if the fish plate hole is too large besides elliptical, because of wear, the rib L. will fill in this part.

We are aware that key bolts of this nature have been invented but our improvements consist in the burs K. and the rib L. which permit the bolt to be used for any sized hole; and the teeth and notches on the surfaces of the shank D. which fasten the fish plates tightly when the keys have been driven home.

What we claim as new and desire to secure by Letters Patent is:—

1. The combination, with the railway rails A and fish plates B B, of the key bolts C C having a series of teeth on the rounded surfaces of their shanks, and having a series of beveled notches in the flat surfaces of their shanks, and having projecting tongues on the edge of the heads of the key bolts C C which tongues fit into the beveled notches of the corresponding key bolts applied to said rails and fish plates, substantially as shown and described.

2. The combination, with the railway rails A and fish plates B B, of the key bolts C C having a tapered rib L on the rounded surface of their shank and burs K K on the sides of their shank, and having a series of teeth on the rounded surface of their shanks and a series of beveled notches in the flat surface of their shanks and having a projecting tongue on the edge of the head of the key bolts C C, which tongue fits into the beveled notches of the corresponding key bolt, applied to said rails and fish plates, substantially as shown and described.

CHARLES DREIBUSS.
ANTHONY F. KULAGE.

Witnesses:
GUSTAV H. OBERBECK,
CHAS. W. OBERBECK.